United States Patent
Yano et al.

(10) Patent No.: US 8,373,904 B2
(45) Date of Patent: Feb. 12, 2013

(54) IMAGE PROCESSING APPARATUS AND IMAGE FORMING APPARATUS

(75) Inventors: Toshiyuki Yano, Kanagawa (JP); Atsushi Kitagawara, Kanagawa (JP); Toshifumi Takahira, Kanagawa (JP); Masaomi Sakamoto, Kanagawa (JP); Toshie Kobiyama, Kanagawa (JP); Daigo Hama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 975 days.

(21) Appl. No.: 11/783,830

(22) Filed: Apr. 12, 2007

(65) Prior Publication Data

US 2008/0013136 A1    Jan. 17, 2008

(30) Foreign Application Priority Data

Jul. 14, 2006 (JP) .................. 2006-194808

(51) Int. Cl.
    *H04N 1/58* (2006.01)
(52) U.S. Cl. ......... 358/3.27; 358/1.9; 358/532; 358/530
(58) Field of Classification Search .............. 358/1.9, 358/500, 521, 3.27, 532, 530, 518, 3.06, 358/1.1, 2.1; 382/266, 167; 348/252
    See application file for complete search history.

(56) References Cited

U.S. PATENT DOCUMENTS

| | | | | |
|---|---|---|---|---|
| 5,179,651 A * | 1/1993 | Taaffe et al. | ............ | 345/555 |
| 5,359,437 A * | 10/1994 | Hibi | ............ | 358/529 |
| 5,386,305 A * | 1/1995 | Usami | ............ | 358/518 |
| 5,592,311 A * | 1/1997 | Hibi | ............ | 358/518 |
| 6,084,554 A * | 7/2000 | Hirose et al. | ............ | 345/5 |
| 6,718,059 B1 * | 4/2004 | Uchida | ............ | 382/176 |
| 6,731,788 B1 * | 5/2004 | Agnihotri et al. | ............ | 382/157 |
| 7,027,183 B2 * | 4/2006 | Ohshima | ............ | 358/1.9 |
| 7,142,711 B2 * | 11/2006 | Goto et al. | ............ | 382/167 |

(Continued)

FOREIGN PATENT DOCUMENTS

JP    08-046799 A    2/1996
JP    A 2002-112036    4/2002

(Continued)

OTHER PUBLICATIONS

English-language translation of Japanese Office Action from Japanese Application No. FE 06-01219, mailed Oct. 26, 2010.

*Primary Examiner* — King Poon
*Assistant Examiner* — Allen H Nguyen
(74) *Attorney, Agent, or Firm* — Oliff & Berridge, PLC

(57) ABSTRACT

According to an aspect of the invention, an image processing apparatus includes an adjustment section, an edge enhancement section, a reception section and a changing section. The adjustment section performs adjustment of a black amount for an input image signal including a plurality of color signals. The adjustment section outputs an output image signal including a plurality of color signals that contain black whose amount is adjusted. The edge enhancement section performs an edge enhancement process for the output image signal output from the adjustment section. The reception section receives setting of an edge enhancement degree used in the edge enhancement section. The changing section changes setting of the adjustment of the black amount in the adjustment section, according to the setting of the edge enhancement degree received by the reception section.

12 Claims, 14 Drawing Sheets

U.S. PATENT DOCUMENTS

| | | | |
|---|---|---|---|
| 7,196,339 B2 * | 3/2007 | Namba et al. | 250/458.1 |
| 7,268,914 B2 * | 9/2007 | Noguchi et al. | 358/1.9 |
| 7,813,005 B2 * | 10/2010 | Arai | 358/2.1 |
| 2004/0051886 A1 | 3/2004 | Sasaki et al. | |
| 2005/0036047 A1 * | 2/2005 | Kohashi et al. | 348/272 |
| 2006/0187246 A1 * | 8/2006 | Miyagi | 347/5 |
| 2007/0002152 A1 * | 1/2007 | Fujiwara | 348/252 |
| 2007/0223044 A1 * | 9/2007 | Bailey et al. | 358/3.06 |

FOREIGN PATENT DOCUMENTS

| | | |
|---|---|---|
| JP | A 2002-262122 | 9/2002 |
| JP | 2003-283821 A | 10/2003 |
| JP | 2004-112269 A | 4/2004 |
| JP | 2004-248103 A | 9/2004 |
| JP | 2006-005907 A | 1/2006 |

* cited by examiner

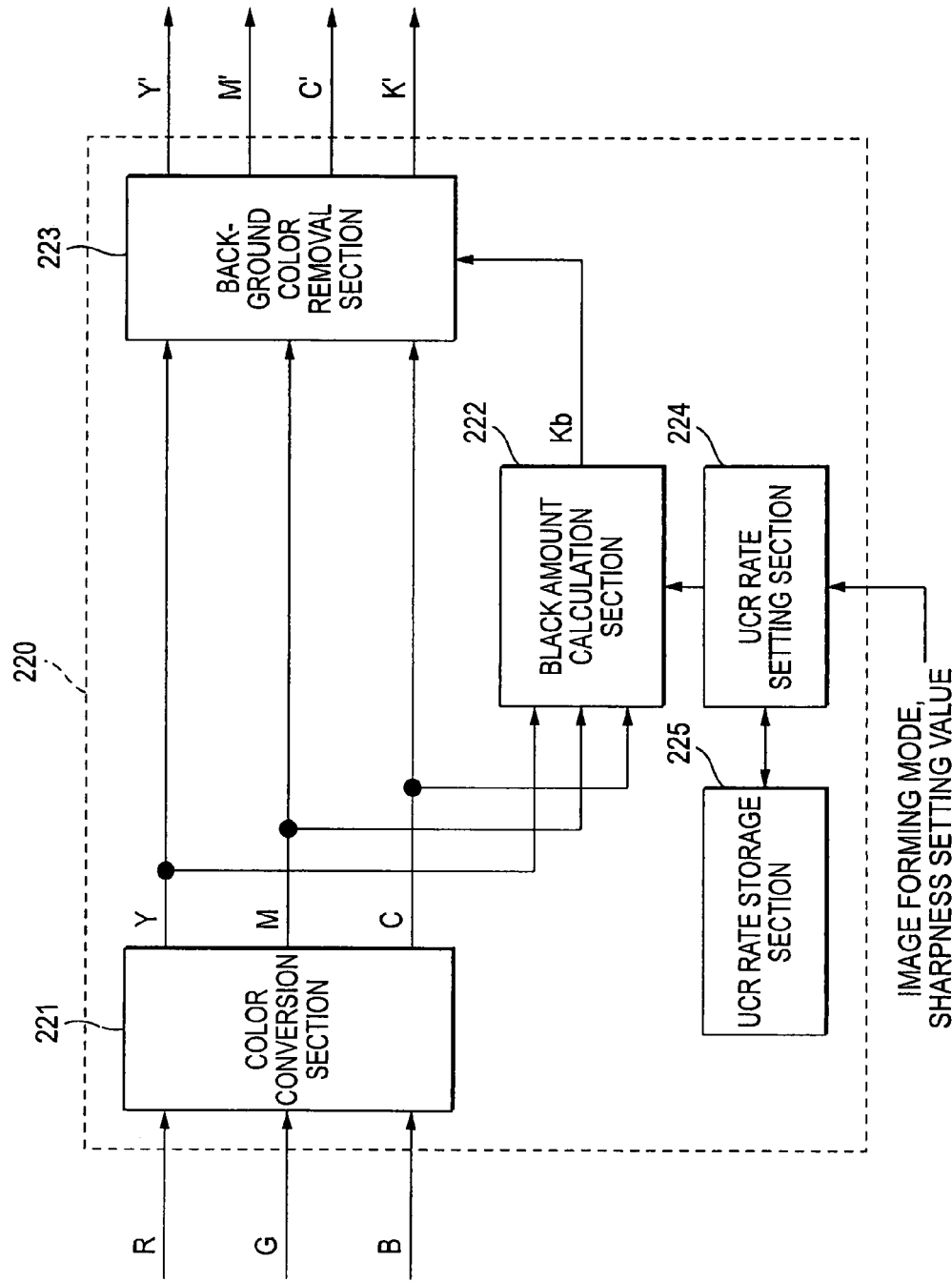

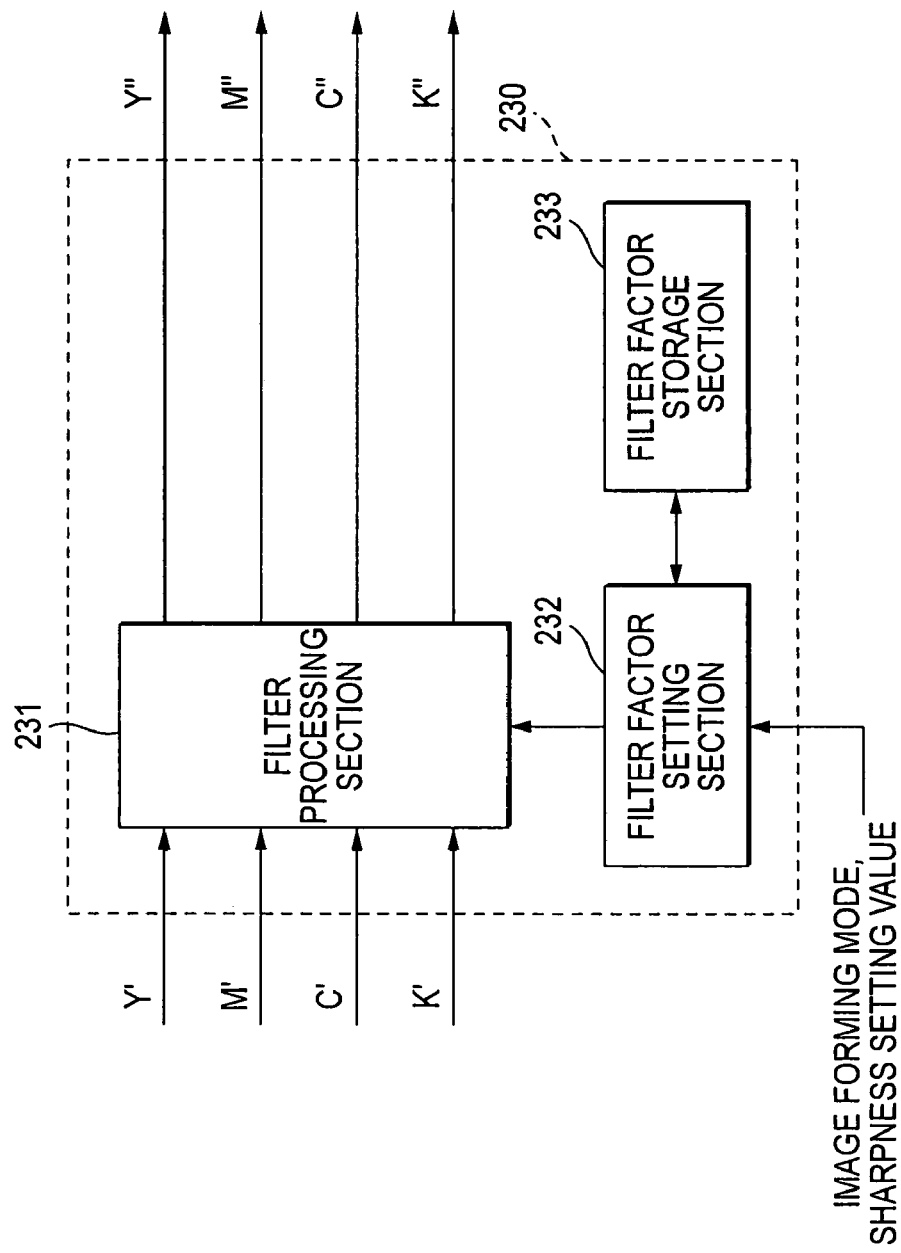

FIG. 6A

CORRECTION VALUE TABLE

| SHARPNESS SETTING VALUE / IMAGE FORMING MODE | WEAK ← NORMAL → STRONG | | | | |
|---|---|---|---|---|---|
| | 1 | 2 | 3 | 4 | 5 |
| PHOTO MODE | T1 | T2 | T3 | T4 | T5 |
| TEXT MODE | T6 | T7 | T8 | T9 | T10 |

FIG. 6B

UCR RATE TABLE

| SHARPNESS SETTING VALUE / IMAGE FORMING MODE | WEAK ← NORMAL → STRONG | | | | |
|---|---|---|---|---|---|
| | 1 | 2 | 3 | 4 | 5 |
| PHOTO MODE | R1 | R2 | R3 | R4 | R5 |
| TEXT MODE | R6 | R7 | R8 | R9 | R10 |

FIG. 6C

FILTER FACTOR TABLE

| SHARPNESS SETTING VALUE / IMAGE FORMING MODE | WEAK ← NORMAL → STRONG | | | | |
|---|---|---|---|---|---|
| | 1 | 2 | 3 | 4 | 5 |
| PHOTO MODE | F1 | F2 | F3 | F4 | F5 |
| TEXT MODE | F6 | F7 | F8 | F9 | F10 |

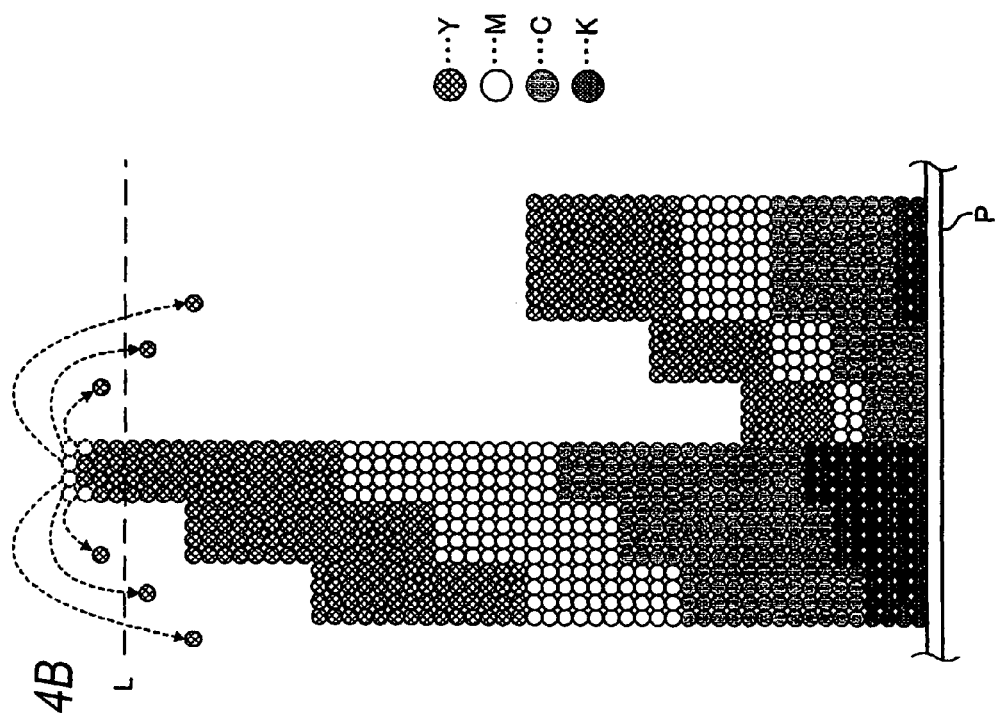
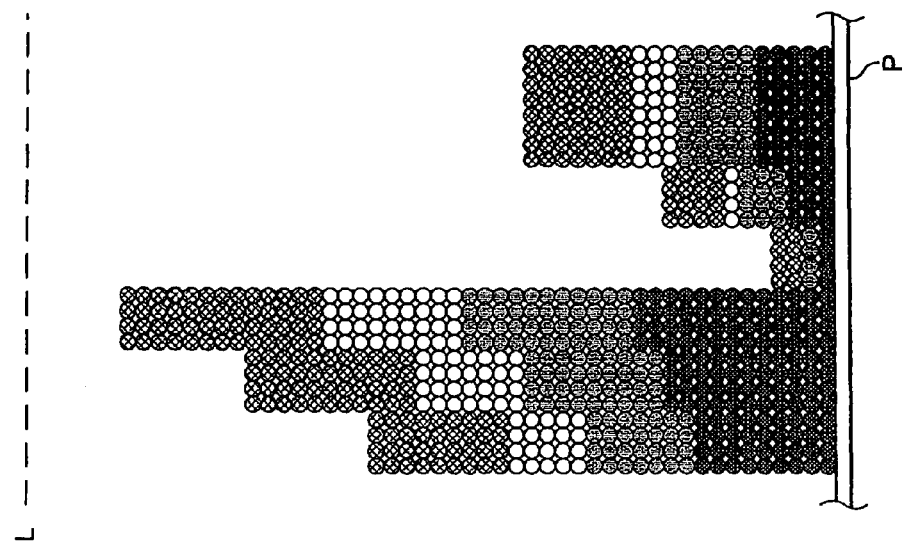
FIG. 14B
FIG. 14A

IMAGE PROCESSING APPARATUS AND IMAGE FORMING APPARATUS

CROSS-REFERENCE TO RELATED APPLICATIONS

This application is based on and claims priority under 35 U.S.C. §119 from Japanese Patent Application No. 2006-194808 filed Jul. 14, 2006.

BACKGROUND

Technical Field

The invention relates to an image processing apparatus for processing an image signal including plural color signals and an image forming apparatus for forming an image on a recording material on the basis of the processed image signal.

SUMMARY

According to an aspect of the invention, an image processing apparatus includes an adjustment section, an edge enhancement section, a reception section and a changing section. The adjustment section performs adjustment of a black amount for an input image signal including a plurality of color signals. The adjustment section outputs an output image signal including a plurality of color signals that contain black whose amount is adjusted. The edge enhancement section performs an edge enhancement process for the output image signal output from the adjustment section. The reception section receives setting of an edge enhancement degree used in the edge enhancement section. The changing section changes setting of the adjustment of the black amount in the adjustment section, according to the setting of the edge enhancement degree received by the reception section.

BRIEF DESCRIPTION OF THE DRAWINGS

Exemplary embodiments of the invention will be described in detail below with reference to the accompanying drawings, wherein:

FIG. 4 is a block diagram showing the detailed configuration of a second color conversion section;

FIG. 5 is a block diagram showing the detailed configuration of a sharpness processing section;

FIG. 6A shows a correction value table stored in a correction value storage section, FIG. 6B shows an UCR rate table stored in an UCR rate storage section, and FIG. 6C shows a filter factor table stored in a filter factor storage section;

FIG. 14A is a view showing a toner image formed based on the CMYK signals obtained by executing the black amount correction and then executing the sharpness process, and FIG. 14B is a view showing a toner image formed based on the CMYK signals obtained by executing the sharpness process without executing the black amount correction.

DETAILED DESCRIPTION

Hereinafter, exemplary embodiments of the invention will be described in detail with reference to the attached drawings.

Figure 1:
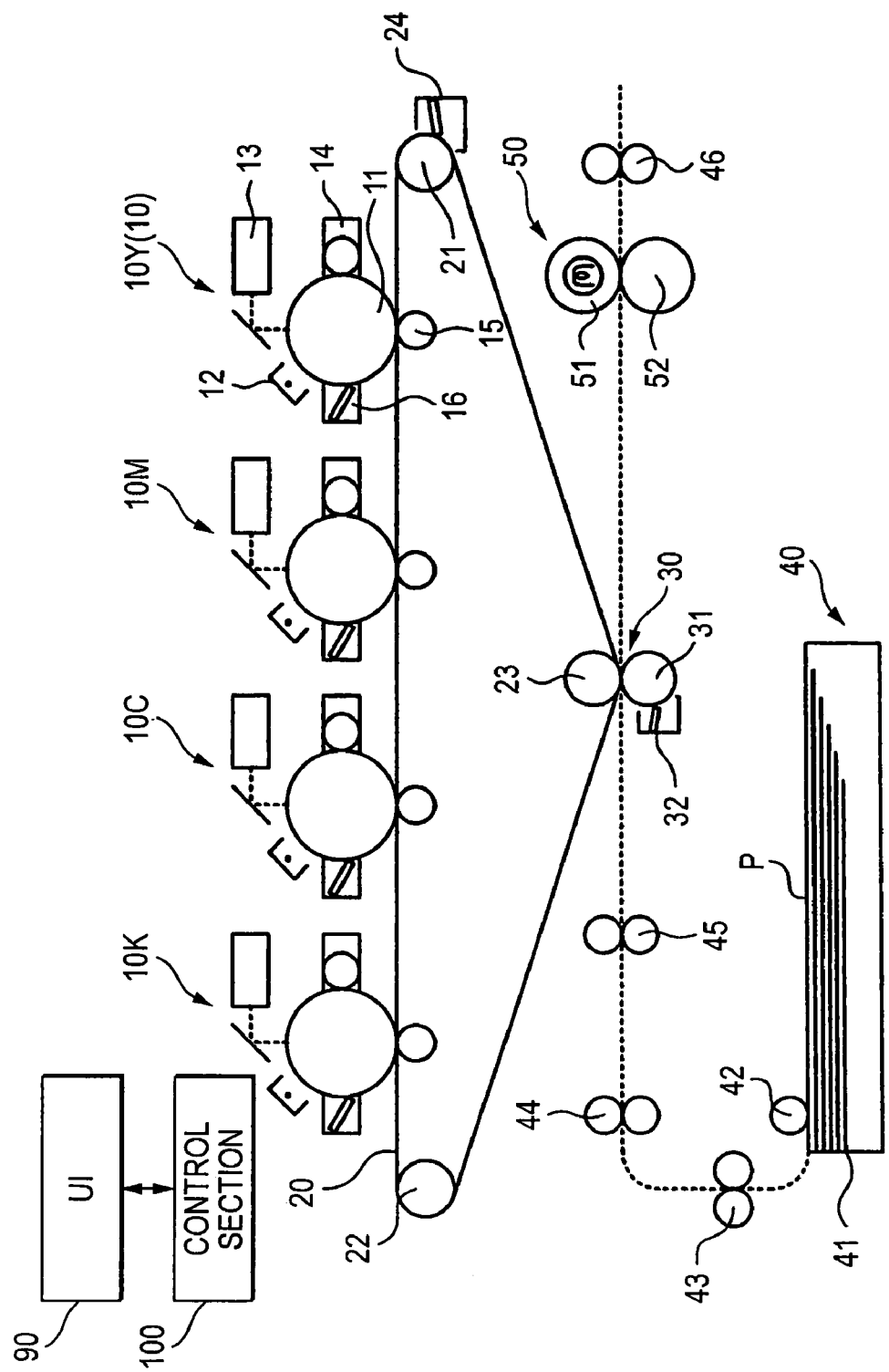
FIG. 1 is a view showing the outline of an image forming apparatus according to an exemplary embodiment of the invention.

FIG. 1 is a view showing the outline of an image forming apparatus according to an exemplary embodiment of the invention. The image forming apparatus includes plural (in this exemplary embodiment, four) image forming units 10, an intermediate transfer belt 20, a secondary transfer device 30, a sheet carrying device 40, and a fixing device 50. The image forming apparatus further includes a control section 100 and a user interface (UI) 90.

The image forming unit 10 includes a yellow unit 10Y for forming a yellow image, a magenta unit 10M for forming a magenta image, a cyan unit 10C for forming a cyan image, and a black unit 10K for forming a black image. The yellow unit 10Y, the magenta unit 10M, the cyan unit 10C and the black unit 10K form toner images of respective color components as images, by the electrophotography system.

The image forming units 10Y, 10M, 10C and 10K, which may serve as an image forming section, have the same configuration except colors of the used toner. Accordingly, for example, the yellow unit 10Y will be described below. The yellow unit 10Y includes a photosensitive drum 11, a charging device 12, an exposure device 13, a developing device 14, a primary transfer device 15 and a drum cleaner 16. Among them, the photosensitive drum 11 includes an not-shown photosensitive layer formed on its outer circumferential surface and is rotatably provided. The charging device 12 charges the photosensitive layer of the photosensitive drum 11 to a predetermined potential. The exposure device 13 exposes the charged photosensitive layer of the photosensitive drum 11 to form an electrostatic latent image. The developing device 14 receives each color component toner (in the yellow unit 10Y, yellow toner) and develops the electrostatic latent image formed on the photosensitive layer of the photosensitive drum 11 with the toner. The primary transfer device 15, for example, includes a roll member (primary transfer roll) which is in pressure-contact with the photosensitive drum 11 via the intermediate transfer belt 20 with the intermediate transfer belt interposed between the primary transfer device 15 (roll member) and the photosensitive drum 11. The primary transfer device 15 applies a predetermined transfer bias between the photosensitive drum 11 and the primary transfer roll to primarily transfer the toner image formed on the photosensitive drum 11 onto the intermediate transfer belt 20. The drum cleaner 16 removes remaining toner on the photosensitive drum 11 after the primary transfer.

The intermediate transfer belt 20, which may serve as a recording material, is disposed rotatably and wound on a driving roll 21, a driven roll 22 and a backup roll 23. Among them, the driving roll 21 is rotatable, stretches the intermediate transfer belt 20 and transmits a driving force to the intermediate transfer belt 20. The driven roll 22 is rotatable, stretches the intermediate transfer belt 20 and is rotated as the intermediate transfer belt 20 rotates. The backup roll 23 is rotatable, stretches the intermediate transfer belt 20 and may serve as a constituent component of the secondary transfer device 30 as described below. A belt cleaner 24 for removing the remaining toner on the intermediate transfer belt 20 after secondary transfer is provided so as to face a part of the intermediate transfer belt 20 wound on the driving roll 21.

The secondary transfer device 30 includes a secondary transfer roll 31 that is rotatable and that is in pressure-contact with a surface, on a side where the toner image is carried, of the intermediate transfer belt 20. The secondary transfer device 30 also includes a backup roll 23 disposed on the rear surface of the intermediate transfer belt 20 to form an opposite electrode for the secondary transfer roll 31. A predetermined secondary transfer bias is applied between the secondary transfer roll 31 and the backup roll 23 such that the toner image on the intermediate transfer belt 20 is secondarily transferred onto a sheet of paper P. For example, a roll cleaner 32 for removing the toner transferred from the intermediate transfer belt 20 to the secondary transfer roll 31 is mounted on the secondary transfer roll 31.

The sheet carrying device 40 includes a sheet accommodating section 41, a pickup roll 42, a separation roll 43, a preregistration roll 44, a registration roll 45 and an ejection roll 46. The sheet accommodating section 41 has an opening at its upper part, has a rectangular shape and accommodates the sheet P therein. The pickup roll 42 is provided above the sheet accommodating section 41 to continuously feed an uppermost sheet P of the stack of sheets P accommodated in the sheet accommodating section 41. The separation roll 43 separates and carries the sheets P, which are continuously fed by the pickup roll 42, one by one. The preregistration roll 44 carries the sheet P carried through the separation roll 43 downstream and forms a loop together with the registration roll 45. The registration roll 45 pauses the carrying of the sheet P and resumes the rotation at a predetermined timing so as to feed the sheet P while control the registration with respect to the secondary transfer device 30. The ejection roll 46 carries the sheet P, on which the toner image is transferred by passing through the secondary transfer device 30 and is fused by passing through the fixing device 50, toward a not-shown ejection section.

The fixing device 50 includes a heating roll 51 which has a heating source therein and which is rotatable. The fixing device 50 also includes a pressing roll 52 which is in contact with the heating roll 51 and rotates as the heating roll 51 rotates.

Figure 2:
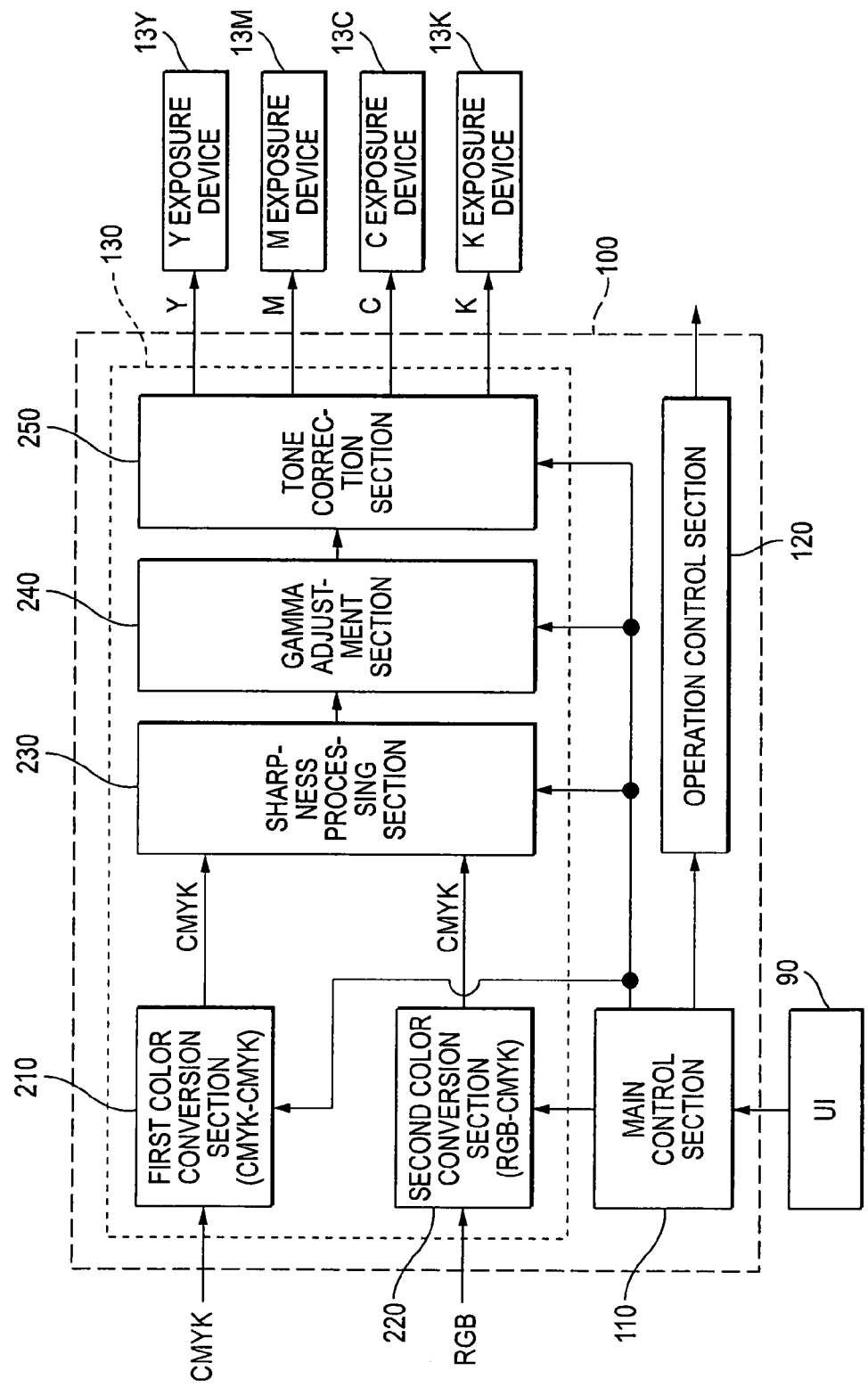
FIG. 2 is a block diagram showing the detailed configuration of a control section.

FIG. 2 is a block diagram showing the detailed configuration of a control section 100. The control section 100 includes a main control section 110, an operation control section 120 and an image processing section 130.

The main control section 110 controls the operation control section 120 and the image processing section 130 to perform the whole control of the image forming apparatus. The main control section 110 transmits various instructions (for example, an image forming mode, image quality setting or the like), which is received from a user through a user interface (UI) 90, to the operation control section 120 or the image processing section 130. The UI 90 may serve as a reception section. The operation control section 120 controls the operations of the respective image forming units 10, the intermediate transfer belt 20, the secondary transfer device 30, the sheet carrying device 40 and the fixing device 50. The image processing section 130 performs a predetermined image process for image data which is input from the outside, and outputs the resultant image signals of yellow, magenta, cyan and black to the respective exposure devices (in particular, a Y (yellow) exposure device 13Y, an M (magenta) exposure device 13M, a C (cyan) exposure device 13C and a K (black) exposure device (13K) provided in the respective image forming units 10 (see FIG. 1)).

The image processing section 130 includes a first color conversion section 210, a second color conversion section 220, a sharpness processing section 230, a gamma adjustment section 240 and a tone correction section 250.

The first color conversion section 210 may serve as an output section or an adjustment section. The first color conversion section 210 performs black amount correction for an input image signal including black (K) (first image signal: in this example, CMYK signals including CMY (cyan, magenta and yellow) as plural color signals which are three primary colors of a color material and K (black)), which is sequentially input on pixel basis from the outside, if necessary. Then, the first color conversion section 210 outputs the resultant output image signal (second image signal: a CMYK signal which is plural color signals).

The second color conversion section 220 converts an input image signal including no black (K) (first image signal: in this example, RGB (red, green and blue) as plural color signals which are three primary colors of colored light), which is sequentially input on pixel basis from the outside, into CMY signals which are three primary colors of the color material. Thereafter, the second color conversion section 220 performs a black (K) adding process, and outputs the resultant output image signal (second image signal: CMYK signals of plural color signals).

The sharpness processing section 230 may serve as a spatial section or an edge enhancement section. The sharpness processing section 230 performs a sharpness process, that is, an edge enhancement process that enhances sharpness of an image, for the output image signal (CMYK signals) sequentially input from the first color conversion section 210 or the second color conversion section 220 on pixel basis, if necessary.

The gamma adjustment section 240 performs gamma adjustment for the CMYK signals sequentially input from the sharpness processing section 230 on pixel basis.

The tone correction section 250 performs tone correction for the CMYK signals sequentially input from the gamma adjustment section 240 on pixel basis, and outputs the resultant image signals of the respective colors to the respective exposure devices 13.

Figure 3:
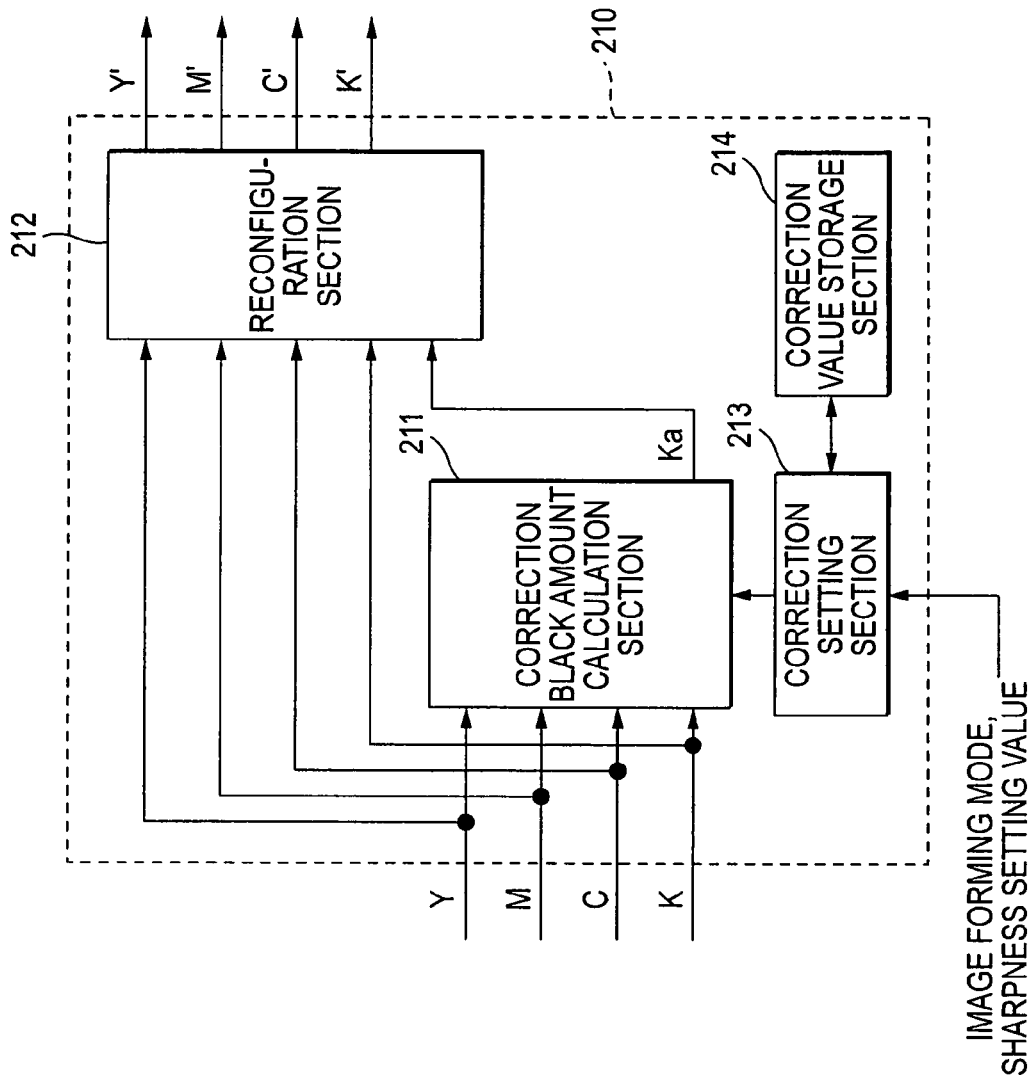
FIG. 3 is a block diagram showing the detailed configuration of a first color conversion section.

FIG. 3 is a block diagram showing the detailed configuration of the first color conversion section 210. The first color conversion section 210 includes a correction black amount calculation section 211, a reconfiguration section 212, a correction setting section 213, and a correction value storage section 214.

The correction black amount calculation section 211 calculates an amount of corrected black, which is obtained by replacing with black a predetermined ratio of a gray component obtained by overlapping C, M and Y, on the basis of the CMYK signals input from the outside on pixel basis. The amount of the corrected black may be referred to as a "correction black amount." The correction black amount calculation section 211 generates a Ka signal, which is a correction image signal of black, on the basis of the calculated correction black amount.

The reconfiguration section 212 subtracts the correction black amount calculated by the correction black amount calculation section 211 from the CMY signals of the CMYK signals which are input from the outside on pixel basis to remove a background color replaced with the Ka signal from the CMY signals, to generate C'M'Y' signals. The reconfiguration section 212 adds the Ka signal generated by the correction black amount calculation section 211 to the K signal of the CMYK signals which are input from the outside on pixel basis and generates a K' signal. The reconfiguration section 212 outputs the C'M'Y'K' signals obtained by applying the K' to the C'M'Y' signals from which the background color has been removed. It is noted that the reconfiguration section 212 removes the background color using the black amount and the CMY signals, which correspond to the same pixel and applies the K' signal to the C'M'Y' signals corresponding to the same pixel to generate the C'M'Y'K' signals.

The correction setting section 213 may serve as a changing section. The correction setting section 213 sets a black correction value used in the correction black amount calculation section 211 on the basis of the instruction received from the user through the UI 90 (see FIG. 1). The black amount correction value is a setting value indicating how many percentage of the gray component obtained by overlapping the CMY signals will be replaced with the black. In this exemplary embodiment, the image forming mode and the sharpness setting value are input to the correction setting section 213 as the instruction from the UI 90. Among them, as the image forming mode relating to settings of image quality, there are provided a photo mode (a mode for giving priority to a photo image) which may be set at the time of forming a photo image or a text mode (a mode for giving priority to a text image) which may be set at the time of forming a text image. As the sharpness setting value relating to settings of an edge enhancement degree or settings of a spatial filter, for example, there are provided five levels from a high level (5), at which an image is sharp, to a low level (1), at which an image is blurred, with "normal" provided as a middle level. Generally, the "normal" is set. The image forming mode may include modes other than the photo mode or the text mode and the sharpness setting value is not limited to the five levels.

The correction value storage section 214 stores plural black amount correction values which is set according to a combination of the image forming mode (the photo mode and the text mode) and the sharpness setting value (the five levels from the high level to the low level).

FIG. 4 is a block diagram showing the detailed configuration of the second color conversion section 220. The second color conversion section 220 includes a color conversion section 221, a black amount calculation section 222, a background color removal section 223, an UCR rate setting section 224, and an UCR rate storage section 225.

The color conversion section 221 sequentially converts the RGB signals which are input from the outside on pixel basis, into CMY signals.

The black amount calculation section 222 calculates an amount of black using a method called the under color removal (UCR) for replacing with black a predetermined ratio of a gray component obtained by overlapping the CMY signals, on the basis of the CMY signals input from the color conversion section 221. The black amount calculation section 222 generates a Kb signal, which is an image signal of black, on the basis of the calculated black amount.

The background color removal section 223 subtracts the black amount calculated by the black amount calculation section 222 from the CMY signals input from the color conversion section 221 to remove the background color replaced with the K signal from the CMY signals and to generate C' M' Y' signals. The background color removal section 223 outputs the C'M'Y'K' signals obtained by applying the Kb (K') signal obtained by the black amount calculation section 222 to the C' M' Y' signals having no background color. It is noted that the background color removal section 223 removes the background color using the black amount and the CMY signals which correspond to the same pixel and applies the Kb (K') signal to the C'M'Y' signals corresponding to the same pixel to generate the C'M'Y'K' signals.

The UCR rate setting section 224 may serve as a changing section. The UCR rate setting section 224 sets a UCR rate used in the black amount calculation section 222 on the basis of the instruction received from user through the UI 90 (see FIG. 1). The UCR rate is a setting value indicating how many percentage of the gray component obtained by overlapping the CMY will be replaced with the black. In this exemplary embodiment, the image forming mode and the sharpness setting value are input to the UCR rate setting section 224 as the instruction from the UI 90, similar to the above.

The UCR rate storage section 225 stores plural UCR rates which are set according to a combination of the image forming mode (the photo mode and the text mode and the sharpness setting value (five levels from the high level to the low level).

FIG. 5 is a block diagram showing the detailed configuration of the sharpness processing section 230. The sharpness processing section 230 includes a filter processing section 231, a filter factor setting section 232 and a filter factor storage section 233.

The filter processing section 231 performs a filter process for the C'M'Y'K' signals which are input from the first color conversion section 210 or the second color conversion section 220 on pixel basis, using the spatial filter. Then, the filter processing section 231 outputs the resultant C"M"Y"K" signals. In this exemplary embodiment, the filter processing section 231 includes a digital filter. Accordingly, the filter processing section 231 may serve as, for example, a low pass filter for selectively passing a relatively low spatial frequency of the C'M'Y'K' signals or a high pass filter for selectively passing a relatively high spatial frequency thereof by changing a filter factor. When the filter processing section 231 serves as the high pass filter, the image forming apparatus forms a sharp image having an enhanced edge on the basis of the obtained C"M"Y"K" signals. When the filter processing section 231 serves as the low pass filter, the image forming apparatus forms a soft image having a suppressed edge on the basis of the obtained C"M"Y"K" signals.

The filter factor setting section 232 sets a filter factor used in the filter processing section 231, on the basis of the instruction received from the user through the UI 90 (see FIG. 1). In this exemplary embodiment, the image forming mode and the sharpness setting value are input to the filter factor setting section 232 as the instruction from the UI 90.

The filter factor storage section 233 stores plural filter factors which are set according to a combination of the image forming mode (the photo mode and the text mode and the sharpness setting value (five levels from the high level to the low level).

FIG. 6A shows a (black amount) correction value table stored in the correction value storage section 214 shown in FIG. 3. The correction value table includes the combinations of the image forming mode and the sharpness setting value. For example, when the sharpness setting value is set to 1 (low level) and the photo mode is selected, a correction value T1 is selected as a black amount correction value. For example, when the sharpness setting value is set to 1 (low level) and the text mode is selected, a correction value T6 is selected. Here, in the case where the sharpness setting value is identical, each of the correction values T1 to T5 of the photo mode is set to be smaller than the corresponding correction value (T6 to T10) of the text mode (T1<T6, T2<T7, T3<T8, T4<T9, T5<T10) in the correction black amount. Meanwhile, in the case where the image forming mode is identical, the correction values are set such that the correction black amount increases as the sharpness setting value increases (as the level of the sharpness increases) (T1<T2<T3<T4<T5, T6<T7<T8<T9<T10).

FIG. 6B shows a UCR rate table stored in the UCR rate storage section 225 shown in FIG. 4. The UCR rate table includes the combinations of the image forming mode and the sharpness setting value. For example, when the sharpness setting value is set to 1 (low level) and the photo mode is selected, a rate R1 is selected as a UCR rate. For example, when the sharpness setting value is set to 1 (low level) and the text mode is selected, a rate R6 is selected. Here, in the case where the sharpness setting value is identical, each of the rates R1 to R5 of the photo mode is set to be smaller than the corresponding rate (R6 to R10) of the text mode (R1<R6, R2<R7, R3<R8, R4<R9, R5<R10) in the generated black amount. Meanwhile, in the case where the image forming mode is identical, the UCR rate is set such that the generated black amount increases as the sharpness setting value increases (as the level of the sharpness increases) (R1<R2<R3<R4<R5, R6<R7<R8<R9<R10).

FIG. 6C shows a filter factor table stored in the filter factor storage section 233 shown in FIG. 5. The filter factor table includes the combinations of the image forming mode and the sharpness setting value. For example, when the sharpness setting value is set to 1 (low level) and the photo mode is selected, a factor F1 is selected as a filter factor. For example, when the sharpness setting value is set to 1 (low level) and the text mode is selected, a factor F6 is selected. Here, in the case where the sharpness setting value is identical, each of the factors F1 to F5 of the photo mode is set to be smaller than the corresponding factor (F6 to F10) of the text mode (F1<F6, F2<F7, F3<F8, F4<F9, F5<F10) in the edge enhancement level. Meanwhile, in the case where the image forming mode is identical, the filter factor is set such that the edge enhancement level increases as the sharpness setting value increases (as the level of the sharpness increases) (F1<F2<F3<F4<F5, F6<F7<F8<F9<F10).

Next, a process of forming a basic image in the image forming apparatus will be described. When a digital image signal is transmitted from a scanner or a computer device (all not shown), the control section 100 generates digital image signals of respective colors and drives the image forming units 10 (in particular, 10Y, 10M, 10C and 10K). Each image forming unit 10 forms the electrostatic latent image according to the digital image signals onto the photosensitive drum 11 uniformly charged by the charging device 12 using the exposure device 13 (in particular, the Y exposure device 13Y, the M exposure device 13M, the C exposure device 13C and the K exposure device 13K). The electrostatic latent image formed on the photosensitive drum 11 is developed by the developing device 14 to form toner images of respective colors.

The toner images formed on the photosensitive drum 11 are sequentially transferred (electrostatic-transferred) from the photosensitive drum 11 onto the surface of the intermediate transfer belt 20 by the action of a transfer field formed between the primary transfer device 15 and the photosensitive drum 11 at a primary transfer position where the photosensitive drum 11 and the intermediate transfer belt 20 contact each other. Meanwhile, the remaining toner on the photosensitive drum 11 is cleaned by the drum cleaner 16 after the transfer.

The toner images which are primarily transferred onto the intermediate transfer belt 20 are overlapped on the intermediate transfer belt 20 and are carried to a secondary transfer position by the rotation of the intermediate transfer belt 20. Meanwhile, the sheet P is carried to the secondary transfer position at a predetermined timing and is nipped between the secondary transfer roll 31 and the backup roll 23.

The toner image held on the intermediate transfer belt 20 is secondarily transferred (electrostatic-transfer) onto the sheet P by the action of the transfer field formed between the secondary transfer roll 31 and the backup roll 23 at the secondary transfer position. The sheet P onto which the toner image is transferred is carried to the fixing device 50 such that the toner image on the sheet P is fused by heating and pressing in the fixing device 50. The sheet P on which the toner image is fused is ejected to an ejection tray (not shown) provided at the outside of the apparatus by the ejection roll 46. Meanwhile, the remaining toner on the intermediate transfer belt 20 is cleaned by the belt cleaner 24 after the transfer.

Next, a process executed, prior to this image forming operation, by the image processing section 130 of the control section 100 shown in FIG. 2, and more particularly, a process of generating image signals of respective colors used in the exposure device 13 will be described. In this exemplary embodiment, there are provided a case where the CMYK signals are input as an input image signal and a case where the RGB signals are input as an input image signal, and the different processes are performed according to the type of the input image signal. Accordingly, the process executed when CMYK signals are input will be first described and the process executed when RGB signals are input will be then described.

Figure 7:
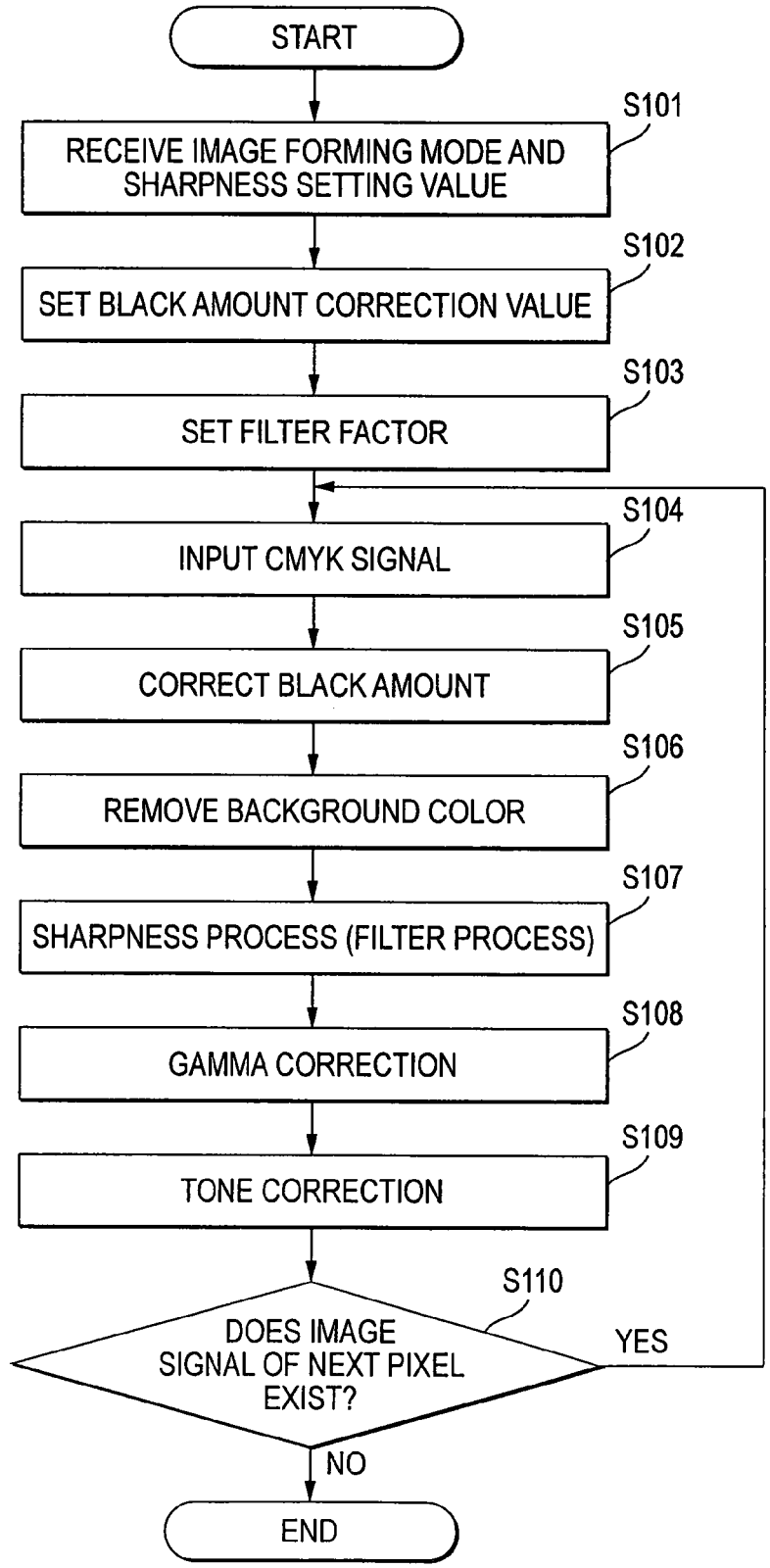
FIG. 7 is a flowchart illustrating a process that is executed when CMYK signals are input.

FIG. 7 is a flowchart illustrating the process executed by the image processing section 130 when the CMYK signals including black (K) is input as an input image signal.

Before the image forming operation starts, the UI 90 receives the image forming mode and the sharpness setting value, which are required for an image to be formed (step 101). The UI 90 outputs the received image forming mode and the received sharpness setting value to the main control section 110. The main control section 110 outputs the received image forming mode and the received sharpness setting value to the first color conversion section 210, the sharpness processing section 230, the gamma adjustment section 240 and the tone correction section 250. When the UI 90 does not receive the image forming mode or the sharpness setting value, the main control section 110 outputs a default image forming mode and a default sharpness setting value to the respective sections.

Next, in the first color conversion section 210, the correction setting section 213 receives the image forming mode and the sharpness setting value, acquires a corresponding black amount correction value from the correction value storage section 214 on the basis of the image forming mode and the sharpness setting value, and sets the acquired black amount correction value in the correction black amount calculation section 211 (step 102).

In the sharpness processing section 230, the filter factor setting section 232 receives the image forming mode and the sharpness setting value, acquires a corresponding filter factor from the filter factor storage section 233 on the basis of the image forming mode and the sharpness setting value, and sets the acquired filter factor in the filter processing section 231 (step 103).

When the image forming operation starts, the CMYK signals are input to the first color conversion section 210 on pixel basis (step 104). Then, in the first color conversion section 210, the correction black amount calculation section 211 performs the black amount correction using the input CMYK signals of each pixel (step 105) and calculates the Ka signal for the black amount correction. Subsequently, in the first color conversion section 210, the reconfiguration section 212 corrects black and removes the background color using the Ka signal for the same pixel calculated by the correction black amount calculation section 211 and the input CMYK signals (step 106). Then, the reconfiguration section 212 outputs the C'M'Y'K' signals which is subjected to the black amount correction.

Then, the C'M'Y'K' signals which are output from the first color conversion section 210 (the reconfiguration section 212) and which are subjected to the black amount correction are input to the sharpness processing section 230 on pixel basis. In the sharpness processing section 230, the filter processing section 231 performs the sharpness process, that is, the spatial filter process for the C'M'Y'K' signals (step S107) and outputs the resultant C"M"Y"K" signals.

Thereafter, the gamma adjustment section 240 performs the gamma adjustment for the C"M"Y"K" signals which are subjected to the sharpness process (step 108), and the tone correction section 250 performs the tone correction (step 109). The resultant CMYK signals output from the tone correction section 250 are input to each exposure device 13 (the Y exposure device 13Y, the M exposure device 13M, the C exposure device 13C and the K exposure device 13K).

The main control section 110 determines as to whether an image signal of a next pixel exists (step 110). If determining that the image signal of the next signal exists, the main control section 110 returns to the step 104 and continues the process. In contrast, when determining that the image data of the next pixel does not exist, the process is finished.

Figure 8:
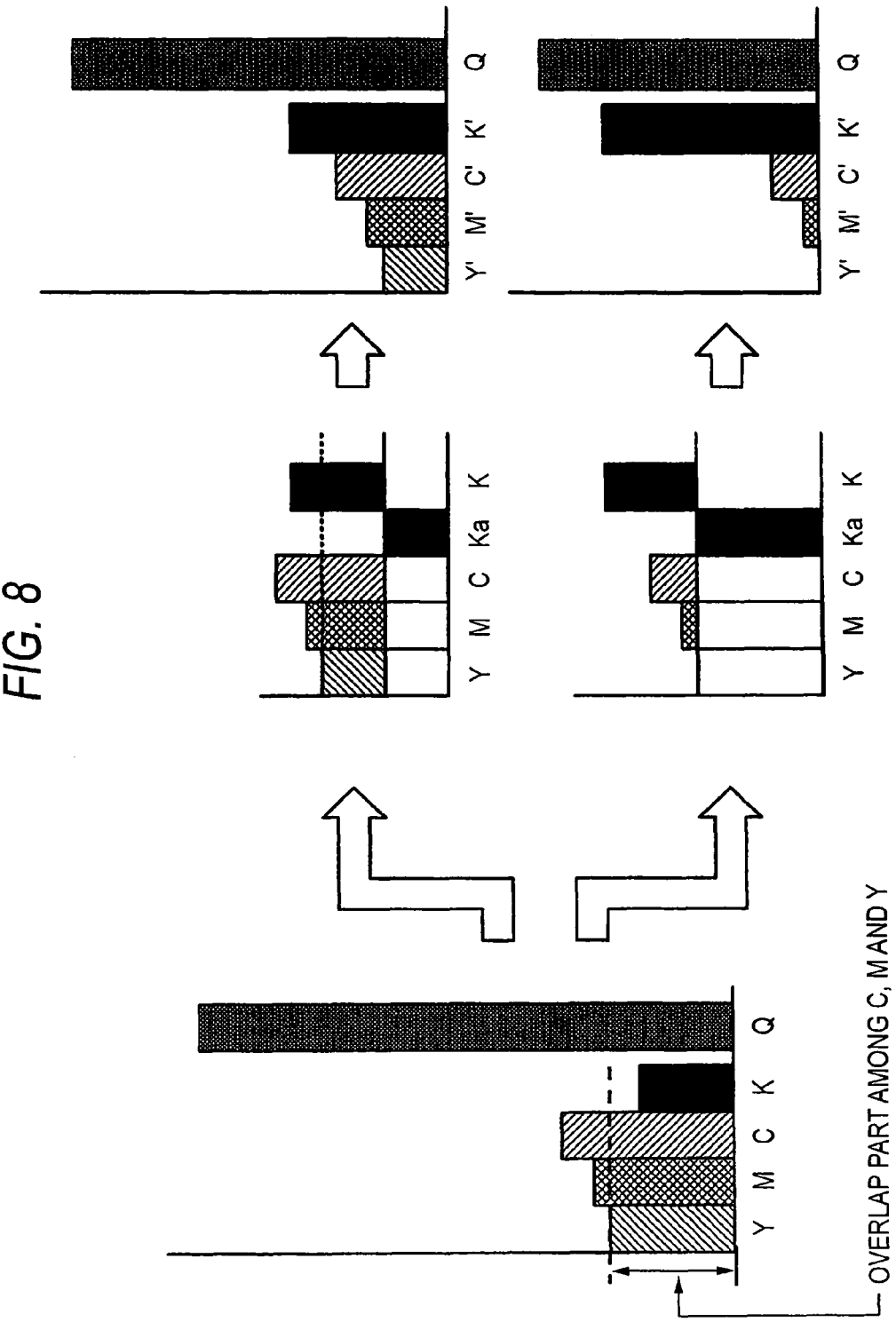
FIG. 8 is a view showing an example of a process executed by the first color conversion section.

FIG. 8 is a view showing an example of the process performed in the step 104 to the step 106.

The left side of FIG. 8 shows CMYK signals which are the input image signal. The total amount Q of the CMYK signals is shown together with the CMYK signals.

The correction black amount calculation section 211 performs the process of replacing a part or all of the overlap part with the black K with focusing attention on the overlap part among the CMY signals of the CMYK signals. For example, when a half (50%) of the overlap part among the CMY signals is replaced with black, the Ka signal corresponding thereto is output from the correction black amount calculation section 211 as shown in the central upper side of FIG. 8. The reconfiguration section 212 subtracts the amount of Ka signal from the CMY signals of the input CMYK signals to generate the C'M'Y' signals and adds the Ka signal to the K signal to generate the K' signal, thereby outputting the resultant C'M'Y'K' signals. Accordingly, the C'M'Y'K' signal as the output image signal and its total amount Q are obtained as shown in the right upper side of the drawing. Meanwhile, for example, when all (100%) of the overlap part among the CMY signals is replaced with the black, the Ka signal corresponding thereto is output from the correction black amount calculation section 211 as shown in the central lower side of FIG. 8. The reconfiguration section 212 generates and outputs the C'M'Y'K' signals in the above-described procedure. Accordingly, the C'M'Y'K' signals as the output image signal and its total amount Q are obtained as shown in the right lower side of FIG. 8.

Here, when the CMYK signals as the input image signal and the C'M'Y'K' signals as the output image signal are compared, it can be seen that the CMY components decrease, but the K component increases, and, as a result, the total amount Q decreases. When the C'M'Y'K' signals as the output image signal are compared with each other, it can be seen that the decrease amount in the total amount Q increases as the rate of replacing the CMY components with the K component increases.

Figure 9:
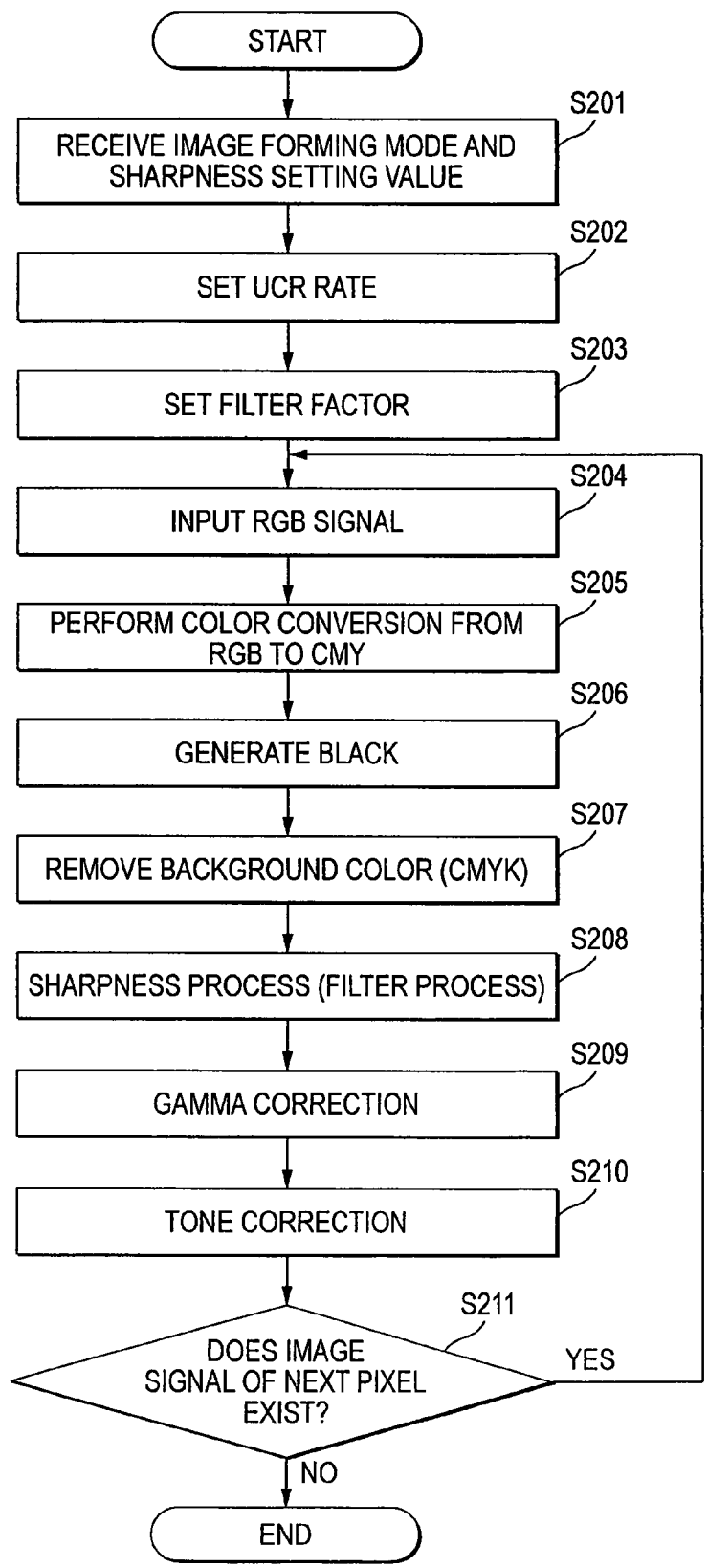
FIG. 9 is a flowchart illustrating a process that is executed when RGB signals are input.

FIG. 9 is a flowchart illustrating a process executed by the image processing section 130 when RGB signals having no black K are input as the input image signal.

Before the image forming operation starts, the UI 90 receives the image forming mode and the sharpness setting value, which are required for an image to be formed (step 201). The UI 90 outputs the received image forming mode and the received sharpness setting value to the main control section 110. The main control section 110 outputs the received image forming mode and the received sharpness setting value to the second color conversion section 220, the sharpness processing section 230, the gamma adjustment section 240 and the tone correction section 250. When the UI 90 does not receive the image forming mode or the sharpness setting value, the main control section 110 outputs a default image forming mode and a default sharpness setting value to the respective sections.

Next, in the second color conversion section 220, the UCR rate setting section 224 receives the image forming mode and the sharpness setting value, acquires a corresponding UCR rate from the UCR rate storage section 225 on the basis of the image forming mode and the sharpness setting value, and outputs the acquired UCR rate to the black amount calculation section 222 (step 202).

In the sharpness processing section 230, the filter factor setting section 232 receives the image forming mode and the sharpness setting value, acquires a corresponding filter factor from the filter factor storage section 233 on the basis of the image forming mode and the sharpness setting value, and sets the acquired filter factor in the filter processing section 231 (step 203).

When the image forming operation starts, the RGB signals are input to the second color conversion section 220 on pixel basis (step 204). Then, in the second color conversion section 220, the color conversion section 221 converts the input RGB signals of each pixel into the CMY signals (step 205). Then, the black amount calculation section 222 performs the UCR process for the input CMY signals, calculates the black amount, that is, generates black (step 206), and generates the Kb signal The background color removal section 223 removes the background color using the CMY signals received from the color conversion section 221 and the K signal for the same pixel received from the black amount calculation section 222 (step 207). Then, the background color removal section 223 outputs the resultant C'M'Y'K' signals in which the black is generated and the background color is removed.

Then, the C'M'Y'K' signals which are subjected to the generating of black and the removal of the background color and which are output from the second color conversion section 220 (the background color removal section 223) are input to the sharpness processing section 230 on pixel basis. In the sharpness processing section 230, the filter processing section 231 performs the sharpness process, that is, the spatial filter process for the C'M'Y'K' signals (step S208) and outputs the resultant C"M"Y"K" signals.

Thereafter, the gamma adjustment section 240 performs the gamma adjustment for the C"M"Y"K" signals which are subjected to the sharpness process (step 209), and the tone correction section 250 performs the tone correction (step 210). The processed CMYK signals output from the tone correction section 250 are input to each exposure device 13 (the Y exposure device 13Y, the M exposure device 13M, the C exposure device 13C and the K exposure device 13K).

The main control section 110 determines as to whether an image signal of a next pixel exists (step 211). If determining that the image signal of the next pixel exists, the main control section 110 returns to the step 204 and continues the process. In contrast, if determining that the image signal of the next pixel does not exist, the process is finished.

Figure 10:
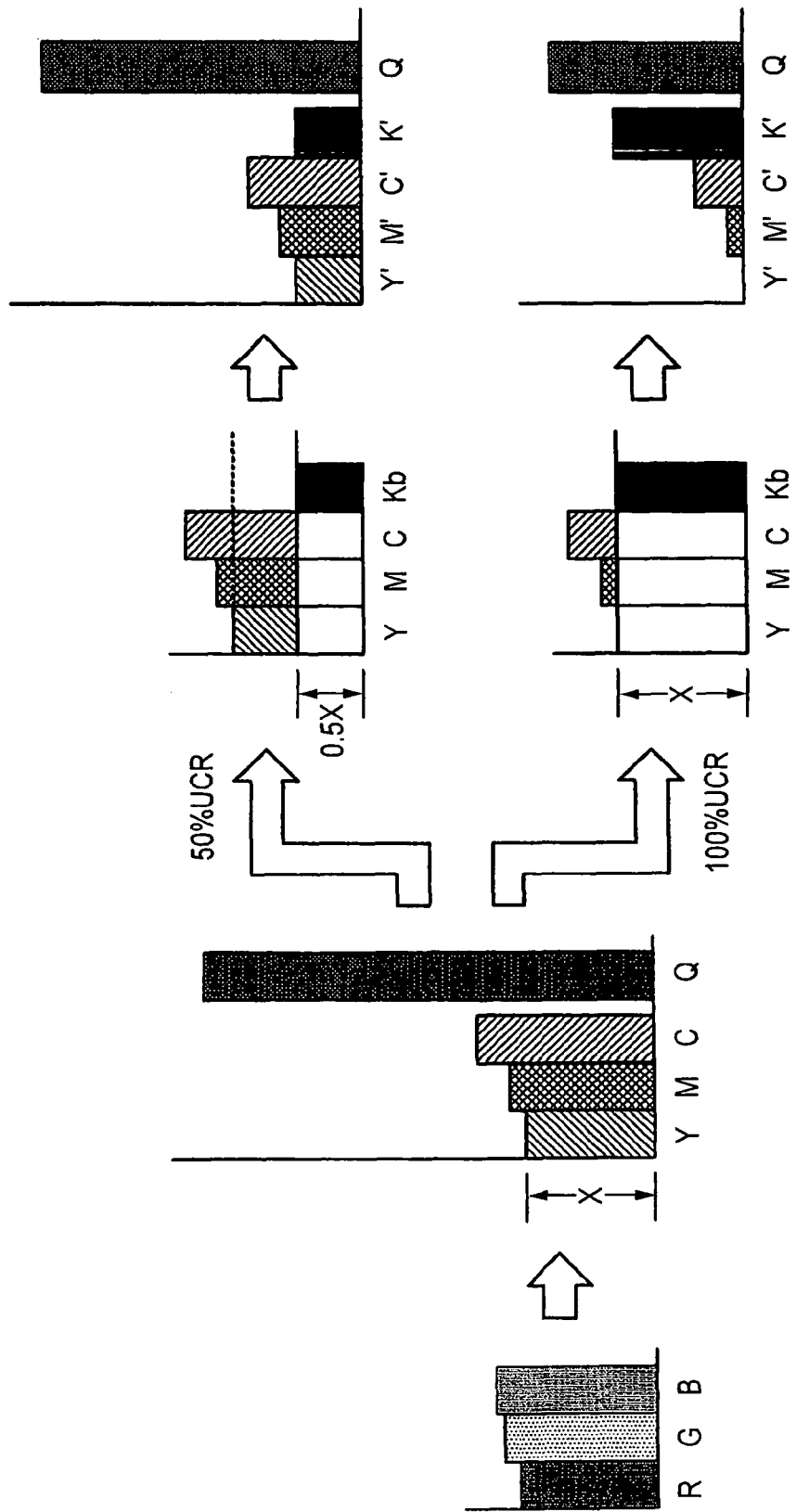
FIG. 10 is a view showing an example of a process executed by the second color conversion section.

FIG. 10 is a view showing an example of the process performed in the step 204 to the step 206.

The left side of FIG. 10 shows the RGB signals as the input image signal. The right side thereof shows the CMY signals obtained by performing the color conversion for the RGB signals by the color conversion section 221. The total amount Q of the CMY signals is shown together with the CMY signals.

The black amount calculation section 222 performs the process of replacing a part or all of the overlap part X with the black K with focusing attention to the overlap part X among the CMY signals. For example, in the case of 50% UCR in which a half of the overlap part among the CMY signals is replaced with black, the Kb signal of 0.5× corresponding thereto is output from the black amount calculation section 222 as shown in the central upper side of FIG. 10. The background color removal section 223 subtracts the amount of Kb signal from the input CMY signals to generate the C'M'Y' signals, adds Kb(K') signal to the generated C'M'Y' signals and outputs the resultant new C'M'Y'K' signals. Accordingly, the C'M'Y'K' signal as the output image signal and its total amount Q are obtained as shown in the right upper side of FIG. 10. Meanwhile, for example, in the case of 100% UCR in which all of the overlap part X among the CMY signals is replaced with black, the Kb signal corresponding thereto is output from the black amount calculation section 222 as shown in the central lower side of FIG. 10. The background color removal section 223 generates and outputs new C'M'Y'K' signals in the above-described procedure. Accordingly, the C'M'Y'K' signals as the output image signal and its total amount Q are obtained as shown in the right lower side of FIG. 10.

Here, when the CMY signals obtained by performing the color conversion of the RGB signals as the input image signal and the C'M'Y'K' signals as the output image signal are compared, it can be seen that a part of the CMY components is replaced with the K component and, as a result, the total amount Q decreases. When the C'M'Y'K' signals as the output image signal are compared with each other, it can be seen that the total amount Q more decreases as the rate of replacing the CMY components with the K component increases.

Then, an example of inputting the CMYK signal as the input image signal will be described in detail. In this description, it is assumed that the text mode which is set as the image forming mode and 5 (high level) which is set as the sharpness setting value are received in the step 101. Accordingly, the black amount correction value T10 is set in the correction black amount calculation section 211 in the step 102. In this case, since the sharpness setting value is 5, the black amount correction value T10 is set. The rate of replacing the CMY signals with the Ka signal becomes larger than that in the case of setting the black amount correction value T9 (in the case where the sharpness setting value is 4).

In the step 103, the filter factor F10 is set in the filter processing section 231.

Figure 11:
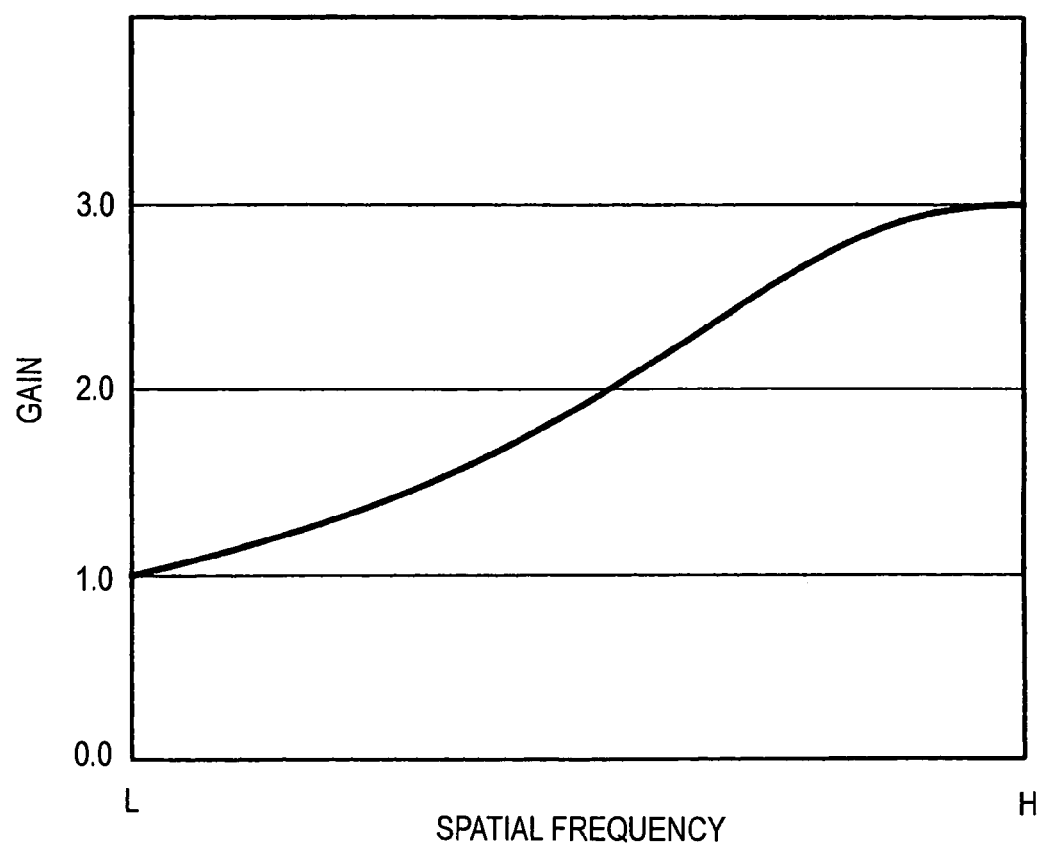
FIG. 11 is a view showing spatial frequency gain characteristics of a spatial filter in a filter processing section.

FIG. 11 is a view showing spatial frequency gain characteristics of the spatial filter in the filter processing section 231 in which the filter factor F10 is set. In this example, the sharpness setting value is 5 and it is required to sharpen the image. The filter processing section 231, in which the filter factor F10 is set, functions as the high pass filter in which the gain is 1.0 in an area having a low spatial frequency (L) and the gain is 3.0 in an area having a high spatial frequency (H).

Figure 12C:
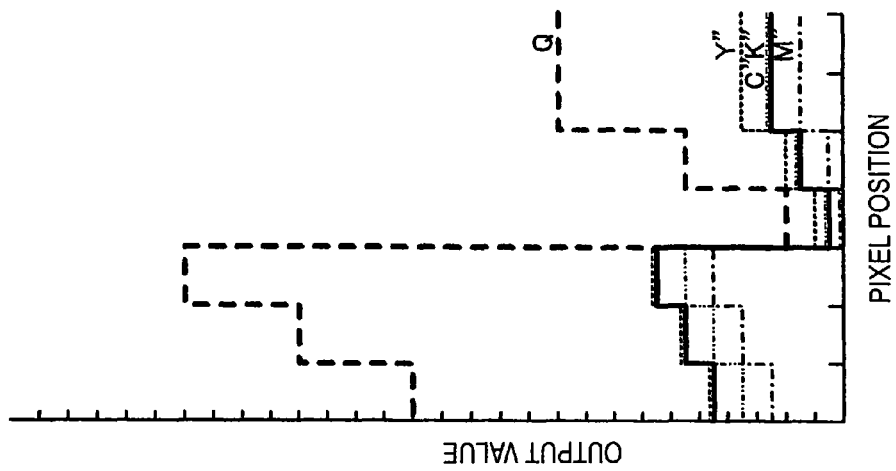
FIGS. 12A to 12C are views illustrating the CMYK signals obtained by executing a black amount correction and then executing a sharpness process.
Figure 12B:
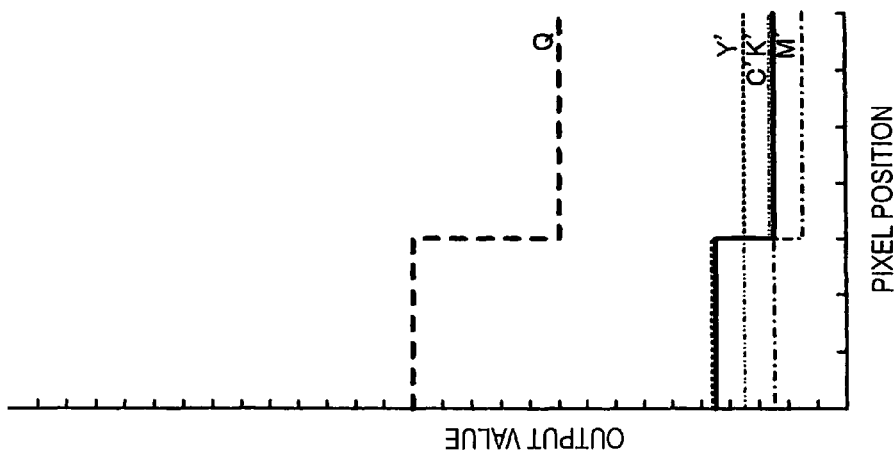
Figure 12A:
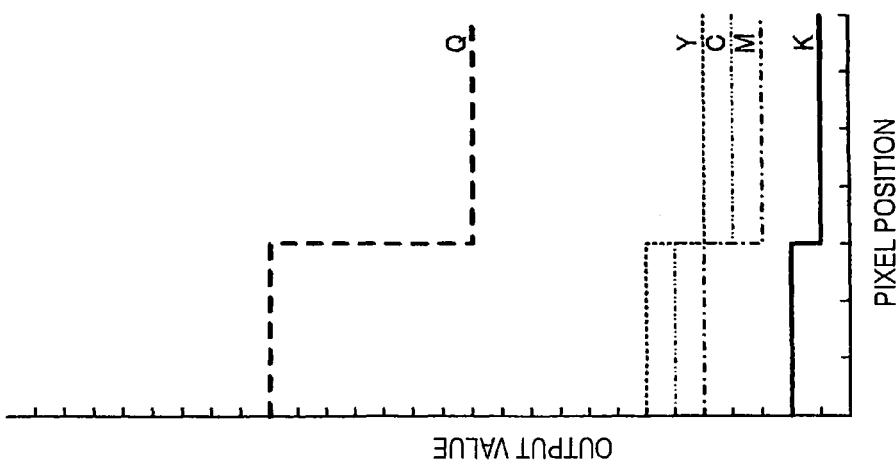

FIG. 12A shows an example of the CMYK signals input to the first color conversion section 210 as the input image signal (the first image signal). In FIG. 12A, a horizontal axis represents positions of pixels and a vertical axis represents output values of the CMYK signals and its total amount Q. The relationship between the horizontal axis and the vertical axis is identical in FIG. 12 and FIG. 13. In the example shown in FIG. 12A, the output values of the CMYK signals and the total amount Q rapidly decrease in a middle part (between a third pixel and a fourth pixel). That is, the CMYK signals shown in FIG. 12A include an edge in an image to be formed.

FIG. 12B shows the C'M'Y'K' signals as the output image signal (the second image signal) which is output after the CMYK signals as the input image signals shown in FIG. 12A is subjected to the color conversion process in the first color conversion section 210. In the example shown in FIG. 12B, the black amount correction using the black amount correction value T10 is performed by the first color conversion section 210. Accordingly, the total amount Q of the C'M'Y'K' signals as the output image signal wholly more decreases as compared with the total amount Q of the CMYK signals as the input image signal (see FIG. 12A).

FIG. 12C shows the C"M"Y"K" signals obtained by performing the sharpness process (the spatial filter process) for the C'M'Y'K' signals which are subjected to the black amount correction and which are shown in FIG. 12B, by the sharpness processing section 230. In the example shown in FIG. 12C, the process using the spatial filter having the gain characteristics shown in FIG. 11 is performed by the sharpness processing section 230. Accordingly, the enhancement process is performed for the edge of the image. Therefore, the resultant C"M"Y"K" signals more increase at the left pixel part of the edge, that is, at a part having a large original output value, and more decrease at the right pixel part of the edge, that is, at a part having a small original output value. Thus, the total amount Q of the C"M"Y"K" signals at the left pixel part of the edge becomes quite larger than the total amount Q (see FIG. 12B) of the C'M'Y'K' signals before the sharpness process.

Here, the case where the CMYK signals are input to the sharpness processing section 230 as the input image signal without performing the black amount correction in the first color conversion section 210 is considered. That is, the CMYK signals shown in FIG. 13A (identical to the CMYK signals shown in FIG. 12A) are directly subjected to the spatial filter process in the sharpness processing section 230.

Figure 13A:
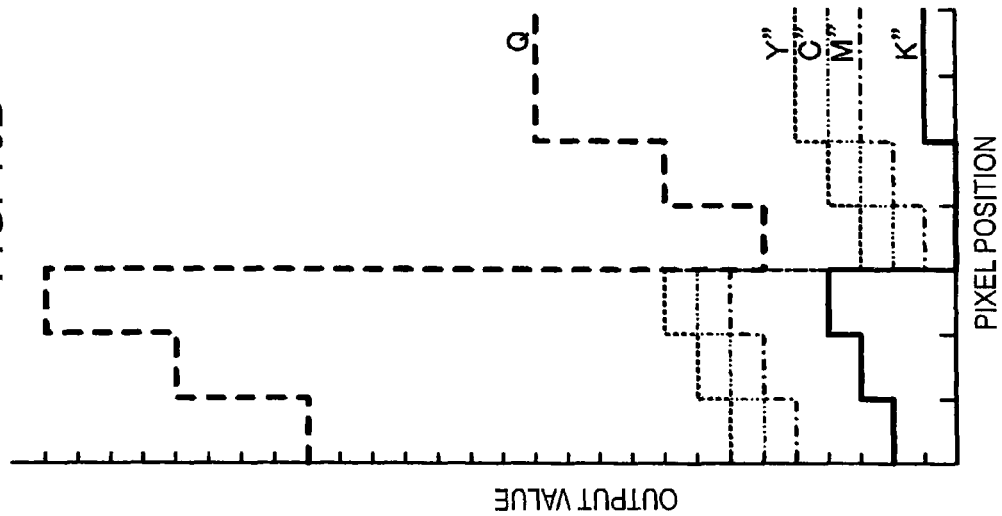
FIGS. 13A and 13B are views illustrating the CMYK signals obtained by executing the sharpness process without executing the black amount correction.
Figure 13B:
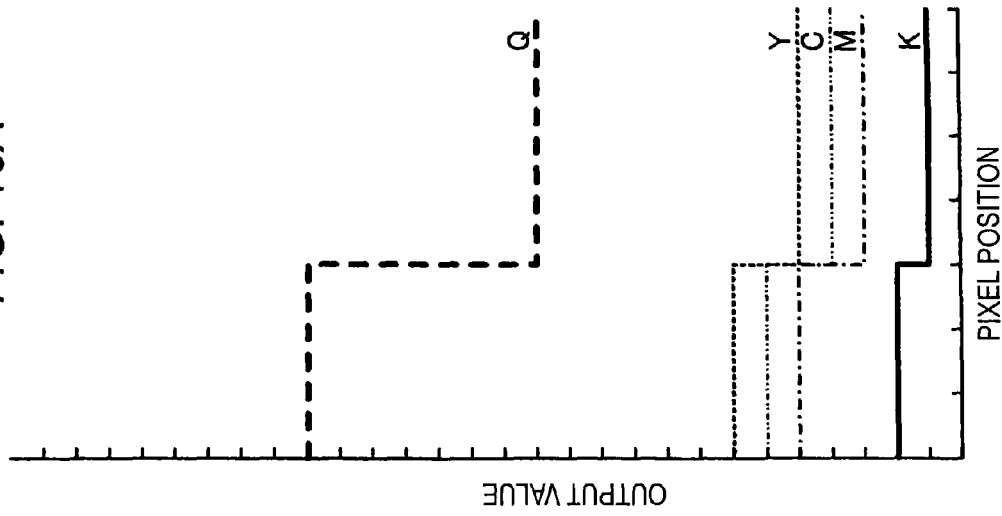

FIG. 13B shows the C"M"Y"K" signals obtained by performing the sharpness process (spatial filter process) for the CMYK signals shown in FIG. 13A, which are not subjected to the black amount correction, by the sharpness processing section 230. Even in the example shown in FIG. 13B, the process using the spatial filter having the gain characteristics shown in FIG. 11 is performed. Accordingly, the enhancement process is performed for the edge of the image so that the resultant C"M"Y"K" signals more increase at the left pixel part of the edge, that is, at a part having a large original output value, and more decrease at the right pixel part of the edge, that is, at a part having a small original output value. Thus, the total-amount Q of the C"M"Y"K" signals at the left pixel part of the edge becomes quite larger than the total amount Q (see FIG. 13A) of the CMYK signals before the sharpness process. However, in this example, since the black amount correction is not performed for the original CMYK signals, the enhancement degree of the output value of each color at the edge more increases. Accordingly, the total amount Q of the C"M"Y"K" signals of the left pixel part of the edge significantly increases as compared with the case of performing the sharpness process (see FIG. 12C).

Here, FIG. 14A shows an image (toner image) of yellow (Y), magenta (M), cyan (C) and black (K) which is transferred onto the sheet P using the image forming apparatus shown in FIG. 1 on the basis of the C"M"Y"K" signals (see FIG. 12C) obtained by performing the sharpness process after performing the black amount correction for the input CMYK signals. Meanwhile, FIG. 14B shows an image of the respective colors which is transferred onto the sheet P using the image forming apparatus shown in FIG. 1 on the basis of the CMYK signals (see FIG. 13B) obtained by performing the sharpness process without performing the black amount correction for the input CMYK signals.

In the example shown in FIG. 14A, since the black amount correction is performed for the original CMYK signals, the total amount of toner used in forming the image more decreases as compared with the example shown in FIG. 14B. In the example shown in FIG. 14A, the total amount of toner at the edge of the image increases by the sharpness process, but the increase degree is low as compared with the example shown in FIG. 14B.

In the image forming apparatus according to this exemplary embodiment, when the secondary transfer is performed, the toner charged to a predetermined charging polarity (for example, a negative polarity) is electrostatic-transferred and attached onto the sheet P charged to a reverse polarity (in this case, a positive polarity). At this time, an electrostatic attachment force acting on the toner decreases as becoming distant from the sheet P.

Accordingly, when the total amount of toner attached to any part is too large, the distance from the sheet P exceeds a limit distance Y for holding the toner. Therefore, the toner cannot be held, and scatter occurs as shown in FIG. 14B. If the scattered toner is attached to a non-image part of the sheet P (the surface of the sheet P), an image quality failure called blur occurs.

In contrast, in this exemplary embodiment, the black correction amount of the input CMYK signals or the black generation amount of the CMY signals obtained by color-converting the input RGB signals is adjusted according to the instructed sharpness setting value. That is, the total amount Q of the CMYK signals after the sharpness process is suppressed in a state that the edge of the image is enhanced according to the sharpness setting and, as a result, the increase in the toner amount at the edge is previously predicted. As a result, even when the image is formed in the image forming apparatus on the basis of the CMYK signals in which the edge is enhanced by the sharpness process, the excess of the toner amount on the sheet P is suppressed and, as a result, the scatter of the toner and the occurrence of the blur due to the scatter of the toner are suppressed.

In this exemplary embodiment, when the same sharpness setting value is set, the black correction amount or the black generation amount in the photo mode becomes less than the black correction amount or the black generation amount in the text mode. Generally, when the amount of conversion from the CMY signals to the K signal is large, the graininess of the image which is finally obtained is lost and thus a rough image is obtained. Accordingly, in consideration of the image having the image quality obtained in the photo mode, such a setting is performed.

In this exemplary embodiment, since the black correction amount or the black generation amount is previously determined on the basis of the sharpness setting value, a recalculation does not need to be performed on the basis of the obtained result. Accordingly, the time consumed form the image process does not increase and thus the deterioration of productivity is suppressed.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an adjustment section that performs adjustment of a black amount for an input image signal including a plurality of color signals based upon a setting value, the adjustment section outputting an output image signal including a plurality of color signals containing black whose amount is adjusted;
   a reception section that receives a setting of an edge enhancement degree from a user via a user interface and receives a setting of an image quality of an image that is to be formed based on the input image signal;
   an edge enhancement section that performs an edge enhancement process for the output image signal output from the adjustment section, in accordance with the setting of the edge enhancement degree received by the reception section; and
   a changing section that changes the setting value of the adjustment of the black amount in the adjustment section, in accordance with the setting of the edge enhancement degree received by the reception section and in accordance with the setting of the image quality received by the reception section,
   wherein, of the image quality received by the reception section gives priority to a text mode, the changing section changes the setting value of the adjustment of the black amount so that the amount of the adjustment of the black amount performed by the adjustment section is larger than that in a case where the setting of the image quality gives priority to a photo mode.

2. The apparatus according to claim 1, wherein the changing section changes the setting value of the adjustment of the black amount so that an amount of the adjustment of the black amount performed by the adjustment section increases as the setting of the edge enhancement degree received by the reception section increases.

3. The apparatus according to claim 1, wherein:
   when the plurality of color signals of the input image signal include black, yellow, magenta and cyan, the adjustment section performs the adjustment of the black amount for the input image signal and outputs the output image signal including the plurality of color signals containing black, yellow, magenta and cyan, and
   the changing section changes the setting value of the adjustment of the black amount in the adjustment section so that an amount of black in the output image signal is larger than or equal to an amount of black in the input image signal and the input image signal and the output image signal are identical in terms of colorimetry.

4. The apparatus according to claim 1, wherein the adjustment section generates a correction image signal of a black based on the adjustment of the black amounts, and the adjusted black signal is obtained by adding the correction image signal and a black signal from the input image signal.

5. The image processing apparatus according to claim 1, wherein
the received setting of the edge enhancement degree is different from the output image signal, and
the setting of the adjustment of the black amount is different from the setting of the edge enhancement degree.

6. An image forming apparatus comprising:
an image processing section that performs a predetermined process for an input image signal and outputs the image signal subjected to the predetermined process; and
an image forming section that forms an image on a recording material based on the image signal which is subjected to the predetermined process and which is output from the image processing section,
wherein the image processing section comprises:
an output section that performs black amount correction based upon a setting value or black generation based upon a setting value for a first image signal including a plurality of color signals, the output section that outputs a second image signal including a plurality of color signals containing black, the second image signal subjected to the black amount correction or the black generation,
a reception section that receives a setting of a spatial filter process from a user via a user interface and receives a setting of an image quality of the image that is to be formed based on the input image signal,
a spatial filter section that performs the spatial filter process for the second image signal output from the output section in accordance with the setting of the spatial filter process received by the reception section, and
a changing section that changes the setting value of the black amount correction or the setting value of the black generation that is used in the output section, in accordance with the setting of the spatial filter process received by the reception section and in accordance with the setting of the image quality received by the reception section,
wherein, when the setting of the image quality received by the reception section gives priority to a text mode, the changing section changes the setting value of the black amount correction or the setting value of the black enervation so that the amount of the correction of the black amount or the amount of the generation of the black performed by the output section is larger than that in a case where the setting of the image quality gives priority to a photo mode.

7. The apparatus according to claim 6, wherein:
the image forming section forms the image having a plurality of colors including black, based on the second image signal subjected to the spatial filter process in the spatial filter unit,
the image forming section electrostatic-transfers the image having the plurality of colors including black on the recording material.

8. The apparatus according to claim 6, wherein the output section generates a correction image signal of a black based on the black amount correction or the black generation, and the black amount correction or the black amount generation is obtained by adding the correction image signal and a black is signal from the input image signal.

9. The image forming apparatus according to claim 6, wherein
the setting of the spatial filter process is different from the second image signal, and
the setting of the black amount correction and the setting of the black generation are different from the setting of the spatial filter process.

10. An image processing apparatus comprising:
adjustment means for performing adjustment of a black amount for an input image signal including a plurality of color signals based upon a setting value, the adjustment means for outputting an output image signal including a plurality of color signals containing black whose amount is adjusted;
reception means for receiving a setting of an edge enhancement degree from a user via a user interface and receiving a setting of an image quality of an image that is to be formed based on the input image signal;
edge enhancement means for performing an edge enhancement process for the output image signal output from the adjustment means, in accordance with a setting of the edge enhancement degree received by the receiving means;
changing means for changing the setting value of the adjustment of the black amount in the adjustment means, in accordance with the setting of the edge enhancement degree received by the reception means and in accordance with the setting of the image quality received by the reception means,
wherein, when the setting of the image quality received by the reception means gives priority to a text mode, the changing means changes the setting value of the adjust black amount so that the amount of the adjustment of the black amount performed by the adjustment means is larger than that in a case where the setting of the image quality gives priority to a photo mode.

11. The apparatus according to claim 10, wherein the adjustment generates a correction image signal of a black based on the adjustment of the black amount, and the adjusted black signal is obtained by adding the correction image signal and a black signal from the input image signal.

12. The image processing apparatus according to claim 10, wherein
the received setting of the edge enhancement degree is different from the output image signal, and
the setting of the adjustment of the black amount is different from the setting of the edge enhancement degree.

* * * * *